United States Patent [19]
Aragon et al.

[11] Patent Number: 5,516,182
[45] Date of Patent: May 14, 1996

[54] RETRACTABLE TOP FOR A BED OF A PICK-UP TRUCK

[76] Inventors: Jorge L. Aragon; Dulce M. Aragon, both of 8845 NW. 116th St., Hialeah Gardens, Fla. 33016

[21] Appl. No.: 369,101

[22] Filed: Jan. 5, 1995

[51] Int. Cl.$^6$ ............................ B60P 7/02; B60P 3/32
[52] U.S. Cl. ........................ 296/100; 276/105; 276/165
[58] Field of Search ........................ 296/10, 100, 104, 296/105, 164, 165, 183

[56] References Cited

U.S. PATENT DOCUMENTS

| | | | |
|---|---|---|---|
| 3,326,598 | 6/1967 | Kunsch | 296/105 |
| 3,342,523 | 9/1967 | Lutgen | 296/100 |
| 3,688,787 | 9/1972 | Feather | 296/105 X |
| 4,285,539 | 8/1981 | Cole | 296/105 |
| 4,770,461 | 9/1988 | Lovaas | 296/100 |
| 4,784,429 | 11/1988 | Hodges | 296/175 X |
| 4,795,206 | 1/1989 | Adams | 296/98 |

FOREIGN PATENT DOCUMENTS

| 21720 | 8/1929 | Australia | 296/105 |
|---|---|---|---|

*Primary Examiner*—Dennis H. Pedder

[57] ABSTRACT

A retractable top for a bed of a pick-up truck including an elongated canopy securable over a bed of a pick-up truck, the canopy formed of a plurality of telescopically mated rigid sections with each section having a generally c-shaped vertical cross-section formed of a generally horizontal top panel and two opposed spaced outer panels and with each outer panel extended downwards from the top panel to define a generally rectangular planar side wall and then extended inwards at a location remote from the top panel to define a bottom flange, each bottom flange including a plurality of rotatable roller mechanisms coupled thereto and extended downwards therefrom; a track mechanism coupleable to side walls of a bed of a pick-up truck and slidably engaged with the roller mechanisms of the canopy for allowing extension and retraction of the canopy; an electrically-energizable drive mechanism coupled to the track mechanism and engaged with the roller mechanisms for extending and retracting the canopy.

2 Claims, 4 Drawing Sheets

RETRACTABLE TOP FOR A BED OF A PICK-UP TRUCK

BACKGROUND OF THE INVENTION

1. Field of the Invention

The present invention relates to a retractable top for a bed of a pick-up truck and more particularly pertains to shielding items placed within a bed of a pick-up truck with a retractable top for a bed of a pick-up truck.

2. Description of the Prior Art

The use of tops and canopies is known in the prior art. More specifically, tops and canopies heretofore devised and utilized for the purpose of shielding items within a bed of a truck are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,815,951 to Nantau et al. discloses a vehicle body retractable top. U.S. Pat. No. 4,756,325 to Daniels discloses a collapsible canopy for pick-up trucks. U.S. Pat. No. 4,995,663 to Weaver et al. discloses a slidable truck cover assembly. U.S. Pat. No. 5,005,896 to Li discloses a retractable truck canopy frame. U.S. Pat. No. 5,282,663 to Horton discloses a retracting system for flexible side walls for cargo vehicles.

While these devices fulfill their respective, particular objective and requirements, the aforementioned patents do not describe a retractable top for a bed of a pick-up truck that is formed of a plurality of rigid sections that are extended and retracted by a motor driving a system of roller mechanisms that are rotatably emplaced on a pair of tracks.

In this respect, the retractable top for a bed of a pick-up truck according to the present invention substantially departs from the conventional concepts and designs of the prior art, and in doing so provides an apparatus primarily developed for the purpose of shielding items placed within a bed of a pick-up truck.

Therefore, it can be appreciated that there exists a continuing need for new and improved retractable top for a bed of a pick-up truck which can be used for shielding items placed within a bed of a pick-up truck. In this regard, the present invention substantially fulfills this need.

SUMMARY OF THE INVENTION

In the view of the foregoing disadvantages inherent in the known types of tops and canopies now present in the prior art, the present invention provides an improved retractable top for a bed of a pick-up truck. As such, the general purpose of the present invention, which will be described subsequently in greater detail, is to provide a new and improved retractable top for a bed of a pick-up truck and method which has all the advantages of the prior art and none of the disadvantages.

To attain this, the present invention essentially comprises, in combination, an elongated canopy securable over a bed of a pick-up truck. The canopy is formed of a rigid front section, a rigid rear section, and a rigid intermediate section. Each section has a generally c-shaped vertical cross-section formed of a generally horizontal planar rectangular top panel and two opposed spaced outer panels. Each outer panel is extended downwards from the top panel to define a generally rectangular planar side wall and then extended inwards at a location remote from the top panel to define a bottom flange. Each section further includes an exterior surface, an interior surface, and a periphery interconnecting the surfaces formed of an inboard edge, an outboard edge, and a pair of opposed side edges extended between the inboard edge and the outboard edge. Each inboard edge of the intermediate section and rear section includes a pair of opposed spaced lips formed thereon. Each lip is projected downwards and outwards at a juncture of one of the side walls with its corresponding bottom flange. Each outboard edge of the front section and intermediate section includes a pair of opposed spaced stops formed thereon. Each stop is projected upwards and inwards at a juncture of one of the side walls with its corresponding bottom flange. The intermediate section is telescopically received and slidably disposed in facing contact with the front section and with the lips of the intermediate section abuttable against the stops of the front section to preclude their separation. The rear section is telescopically received and slidably disposed in facing contact with the intermediate section and with the lips of the rear section abuttable against the stops of the intermediate section to preclude their separation. Each side wall of the front section further includes an oblong recess disposed thereon covered with a generally transparent sheet to define a front window. Each side wall of the intermediate section further includes a generally u-shaped cut out formed thereon at a location adjacent to the outboard edge thereof covered with a generally transparent sheet to define an intermediate window. Each side wall of the rear section further includes a generally u-shaped cut out formed thereon at a location adjacent to the inboard edge thereof covered with a generally transparent sheet define a rear window. The rear window is aligned with the intermediate window to define a telescopically extendable composite window. The rear section additionally includes a generally transparent rear wall having a top edge, a bottom edge, and a pair of opposed side edges extended between the top edge and bottom edge. The top edge of the rear wall is hingeably secured to the outboard edge adjacent to the top panel to define a back window. The rear wall additionally has a latch mechanism coupled thereto for securing the rear wall to a tailgate of a pick-up truck.

A pair of elongated rigid tracks are provided. Each track has an inboard end and an outboard end. Each track further has a generally c-shaped cross-section. Each track includes a bottom wall with an interior surface and an exterior surface. The exterior surface of the bottom wall of each track is securable to a side wall of a pick-up truck adjacent to its bed. A pair of side walls are extended upwards from the bottom wall of each track. Lastly, a pair of opposed coplanar top edges are extended inwardly from the side edges of each track at a location remote from the bottom wall to define a hollow interior portion and a central groove for allowing access to the interior portion. One of the tracks includes a pulley disposed within its interior portion and secured to its outboard end and also includes a through hole disposed thereon near its inboard end. This track thereby defines a drive track.

A first pair and a second pair of roller mechanisms are also included. Each roller mechanism of the first pair is coupled to a separate bottom flange of the intermediate section. One roller mechanism of the first pair is extended downwards into the drive track. The other roller mechanism of the first pair is extended downwards into the other track. Each roller mechanism of the second pair is coupled to a separate bottom flange of the rear section. One roller mechanism of the second pair is extended downwards into the drive track. The other roller mechanism of the second pair is extended downwards into the other track. Each roller mechanism includes a generally vertical shaft having an upper portion positioned within the groove of one of the tracks and a lower portion positioned within the interior portion of one of the tracks, a horizontal rotatable axle coupled to the lower portion of the shaft, and a pair of wheels coupled to the ends of the axle and disposed upon the interior surface of the bottom wall of one of the tracks.

A motor is included and has a fixed stator coupled to the drive track and a rotatable rotor extended within the through hole of the drive track and the interior portion thereof. The stator imparts rotation to the rotor when electrically energized with a positive polarity and further imparts opposite rotation to the rotor when electrically energized with a negative polarity. A drive gear is coupled to the rotor of the motor at a location within the interior portion of the drive track. A belt is also included and extended about the drive gear and pulley of the drive track and engaged with the axles of the roller mechanisms within the drive track. When the motor is energized with a positive polarity, the belt turns for rotating the wheels of the roller mechanisms for allowing the intermediate section and rear section to move along the tracks away from the front section, thereby extending the canopy. When the motor is energized with a negative polarity, the belt turns for rotating the wheels of the roller mechanisms for allowing the intermediate section and rear section to move along the tracks towards the front section, thereby retracting the canopy.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved retractable top for a bed of a pick-up truck which has all the advantages of the prior art tops and canopies and none of the disadvantages.

It is another object of the present invention to provide a new and improved retractable top for a bed of a pick-up truck which may be easily and efficiently manufactured and marketed.

It is a further object of the present invention to provide a new and improved retractable top for a bed of a pick-up truck which is of durable and reliable construction.

An even further object of the present invention is to provide a new and improved retractable top for a bed of a pick-up truck which is susceptible of a low cost of manufacture with regard to both materials and labor, and which accordingly is then susceptible of low prices of sale to the consuming public, thereby making such a retractable top for a bed of a pick-up truck economically available to the buying public.

Still yet another object of the present invention is to provide a new and improved retractable top for a bed of a pick-up truck which provides in the apparatuses and methods of the prior art some of the advantages thereof, while simultaneously overcoming some of the disadvantages normally associated therewith.

Even still another object of the present invention is to provide a new and improved retractable top for a bed of a pick-up truck comprising an elongated canopy securable over a bed of a pick-up truck, the canopy formed of a plurality of telescopically mated rigid sections with each section having a generally c-shaped vertical cross-section formed of a generally horizontal top panel and two opposed spaced outer panels and with each outer panel extended downwards from the top panel to define a generally rectangular planar side wall and then extended inwards at a location remote from the top panel to define a bottom flange, each section further having an exterior surface, an interior surface, and a periphery interconnecting the surfaces formed of an inboard edge, an outboard edge, and a pair of opposed side edges extended therebetween, each bottom flange including a plurality of rotatable roller mechanisms coupled thereto and extended downwards therefrom; a track mechanism coupleable to side walls of a bed of a pick-up truck and slidably engaged with the roller mechanisms of the canopy for allowing extension and retraction of the canopy; and an electrically-energizable drive mechanism coupled to the track mechanism and engaged with the roller mechanisms for extending and retracting the canopy.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, the preferred embodiment of the new and improved retractable top for a bed of a pick-up truck embodying the principles and concepts of the present invention and generally designated by the reference number 10 will be described.

The present invention is comprised of a plurality of components. In their broadest context, such components include a canopy, tracks, roller mechanisms, and a drive mechanism. Such components are individually configured and correlated with respect to each other to provide the intended function of adaptably shielding items placed within a bed of a pick-up truck.

Figure 1:
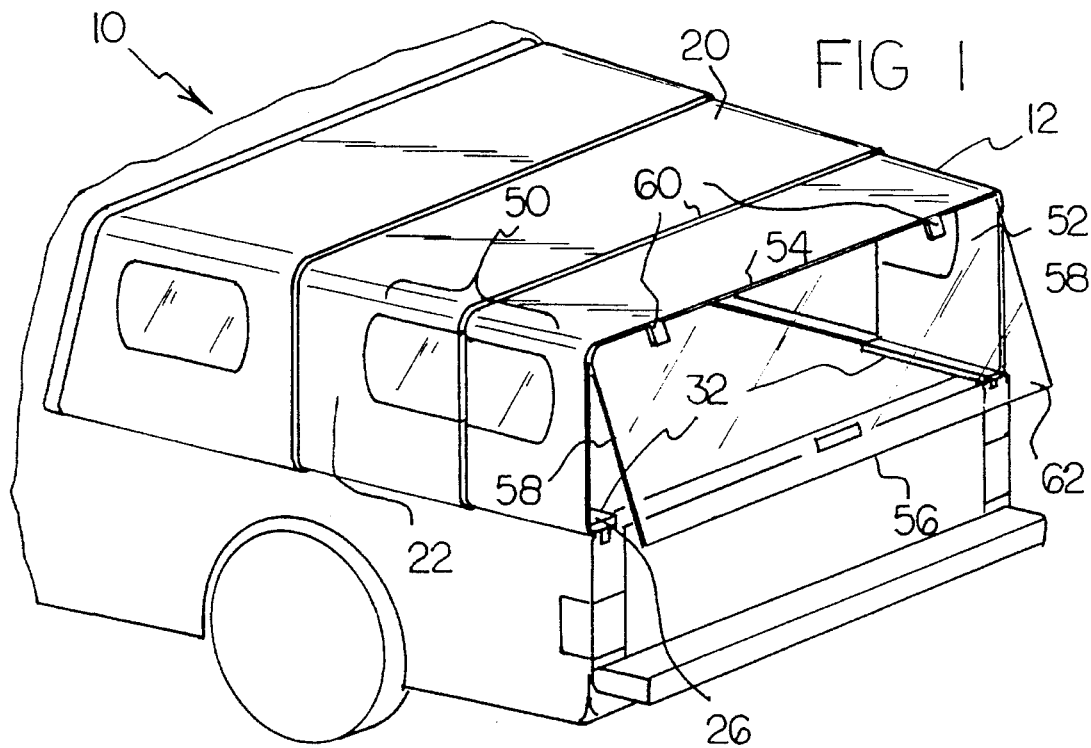
FIG. 1 is a perspective view of the preferred embodiment constructed in accordance with the principles of the present invention secured to a bed of a pick-up truck.

Specifically, the present invention includes an elongated canopy 12 as best illustrated in FIG. 1. The canopy is securable over a bed of a pick-up truck or other similar carrying vehicle. The canopy is formed of a front section 14, a rear section 18, and a intermediate section 16. Each section is formed of a substantially rigid material such as plastic, fiberglass, aluminum, or the like. Each section has a generally c-shaped vertical cross-section formed by a generally horizontal planar rectangular top panel 20 and two spaced opposed outer panels 22 extended downwardly from the top panel. Each outer panel is extended vertically or angularly downwards from the top panel to define a generally rectangular and planar side panel 24. Furthermore, each outer panel is extended inwards at a location remote from the top panel to define a bottom flange 26. The bottom flanges of each section are positioned in opposition to each other. The bottom flanges of all of the sections are contained in a common plane. Each section has an exterior surface, an interior surface, and a periphery interconnecting the surfaces. The periphery is formed of an inboard edge 28, an outboard edge 30, and a pair of opposed side edges 32 extended between the inboard edge and outboard edge as shown in FIG. 1 and FIG. 5.

Figure 5:
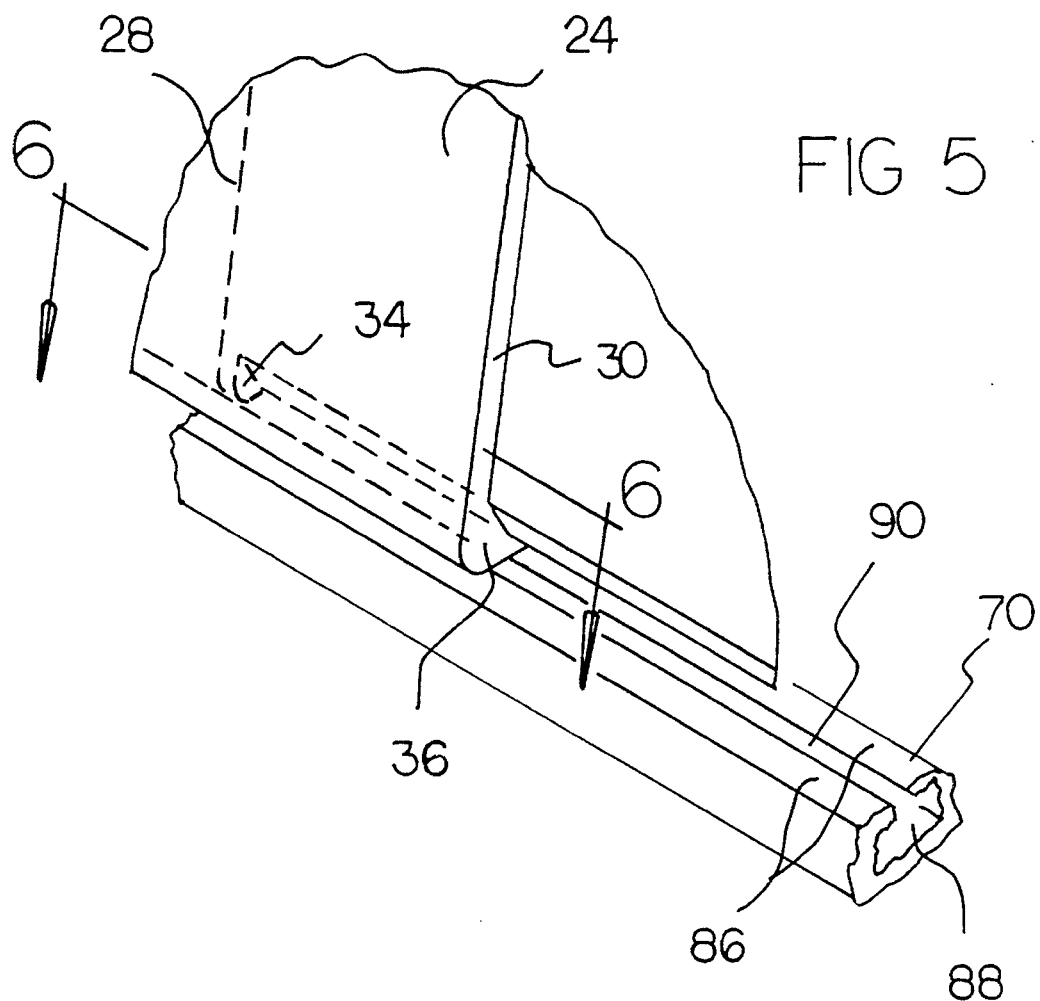
FIG. 5 is an enlarged view of the telescopic mating between two adjacent sections of the present invention.
Figure 6:
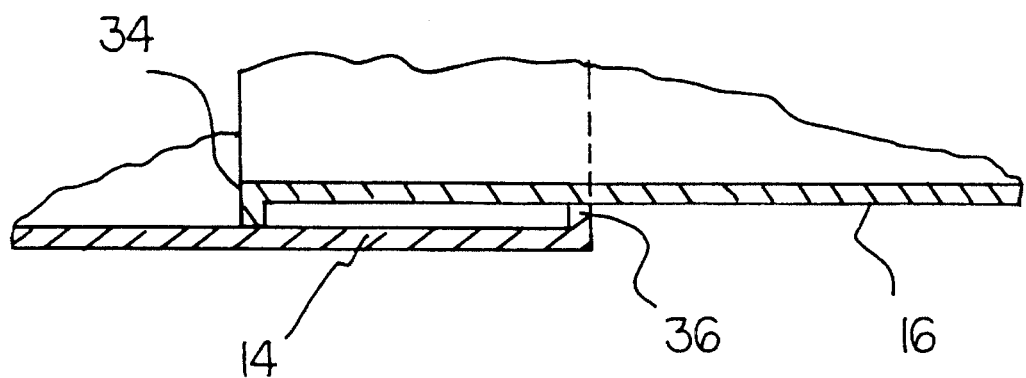
FIG. 6 is a cross-sectional view of the present invention taken along the line 6—6 of FIG. 5.

As best illustrated in FIG. 5, each inboard edge 28 of the intermediate section 16 and rear section 18 includes a pair of opposed spaced lips formed thereon. Each lip 34 is projected downwards and outwards at a juncture of one of the side walls 24 with its corresponding bottom flange 26. Each outboard edge 30 of the front section 14 and intermediate section 16 includes a pair of opposed spaced stops 36 formed thereon. Each stop is projected inwards and upwards at a juncture of one of the side walls with its corresponding bottom flange 26. Both the lips and the flanges are formed as an integral part of the corresponding section.

The intermediate section 16 is telescopically received and slidably disposed in facing contact with the front section 14.

The lips 34 of the intermediate are abuttable against the stops 36 of the front section to preclude the sections from becoming separated. The rear section 18 is telescopically received and slidably disposed within the intermediate section 16. The exterior surface of the rear section and interior surface of the intermediate section are in facing contact. The lips 34 of the rear section are abuttable against the stops 36 of the intermediate section to preclude the sections from becoming separated.

Each side panel 24 of the front section 14 also includes an oblong recess 38 disposed thereon. This recess is covered with a generally transparent sheet 40 of safety glass or plastic to define a front window 42. Each side panel on the intermediate section 16 further includes a generally u-shaped cutout 44 formed thereon at a location adjacent to its outboard edge 30. This cutout is covered with a generally transparent sheet 40 of safety glass or plastic to define an intermediate window 44. Furthermore, each side panel of the rear section 18 further includes a generally u-shaped cutout 46 formed thereon at a location adjacent to its inboard edge 28. This cutout 46 is covered with a generally transparent sheet 40 of safety glass or plastic to define a rear window 48. The rear window 48 is aligned with the intermediate window 44 to thereby create a telescopically extendable composite window 50 as shown in FIG. 1.

Figure 2:
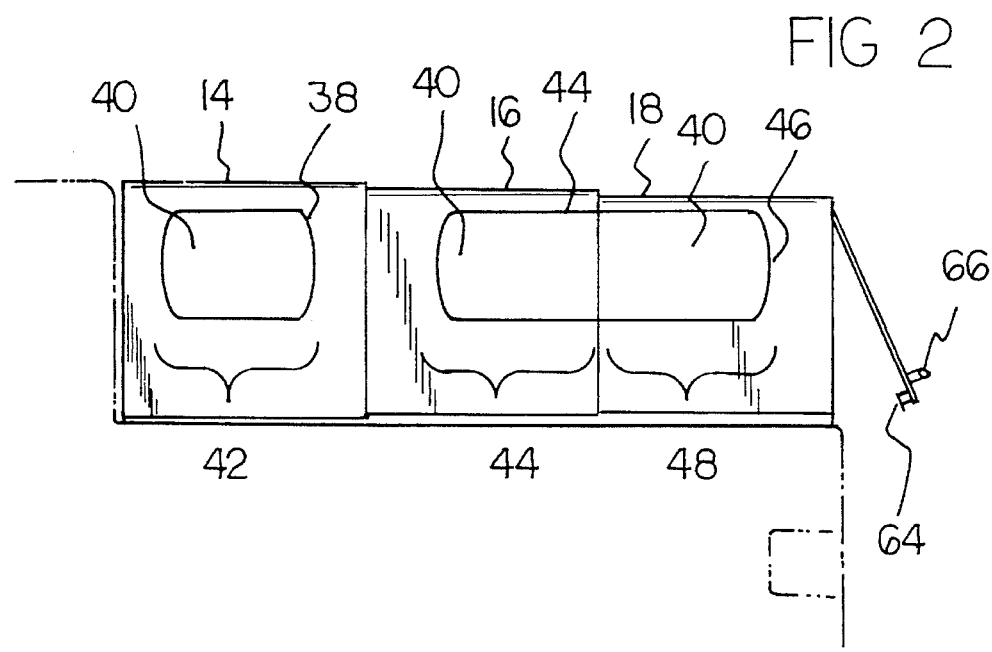
FIG. 2 is a side elevational view of the present invention with its back window opened.

Furthermore, as shown in FIG. 1, the rear section additionally includes a generally transparent rear wall 52. The rear wall is formed of safety glass or plastic. The rear wall has a top edge 54, a bottom edge 56, and a pair of opposed side edges 58 extended therebetween. The rear wall is hingeably secured to the outboard edge 30 of the rear section 18 adjacent to its top panel 20 with a hinge 60. The rear wall in this coupled configuration thus defines a back window 62. The back window additionally has a latch mechanism 64 coupled thereto for securing the rear wall to a tailgate of a pick-up truck as shown in FIG. 1. This latch mechanism is actuated through a handle 66 as shown in FIG. 2. Thus, when the present invention is secured over a bed of a pick-up truck, the back window allows or prevents access to the bed when the canopy is fully extended.

The inboard edge of the front section is sealed to the cab of a pick-up truck as shown in FIG. 1. Alternatively, the inboard edge can be sealed with a front wall. The front wall can be formed of a rigid transparent material or have a window formed thereon for allowing a driver of the vehicle a clear view through the bed.

Figure 4:
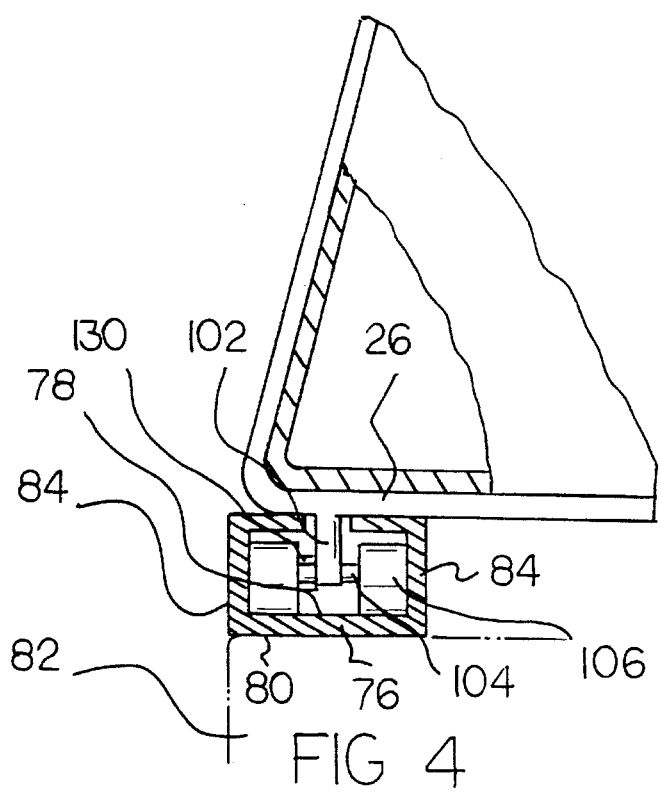
FIG. 4 is a cross-sectional view of the present invention taken along the line 4—4 of FIG. 3.
Figure 7:
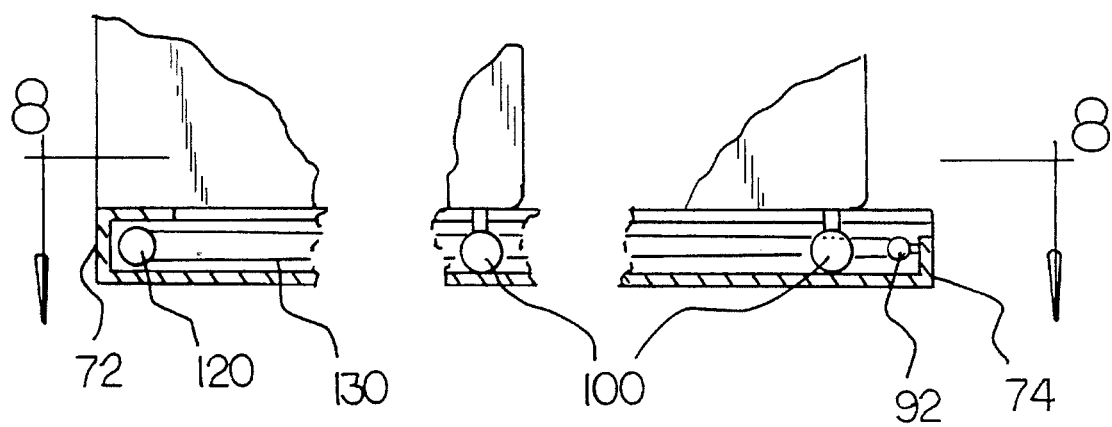
FIG. 7 is a side cross-sectional view of one of the tracks of the present invention.
Figure 8:
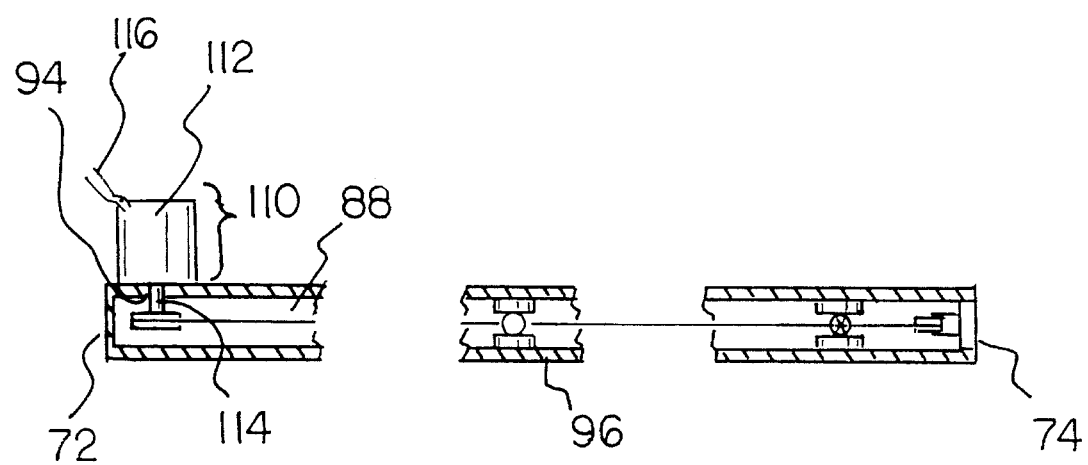
FIG. 8 is a cross-sectional view of the present invention taken along the line 8—8 of FIG. 7.

Also provided are a pair of elongated tracks 70. The tracks are formed of a rigid material such as metal or plastic. Each track has an inboard end 72 and an outboard end 74 as shown in FIG. 7. Each track further has a generally c-shaped cross-section as shown in FIG. 4. Each track includes a bottom wall 76 having an interior surface 78 and an exterior surface 80. The exterior surface is securable to a side wall 82 of a pick-up truck adjacent to its bed. Its track also includes a pair of parallel side walls 84 extended vertically upwards from the bottom wall and a pair of coplanar top edges 86 extended inwardly from the side edges at a location remote from the bottom wall. In this configuration, a hollow interior portion 88 and a central groove 90 for allowing access to the interior portion is created as shown in FIG. 5. One of the tracks includes a rotatable pulley 92 disposed within its interior portion 88 and secured to its outboard end 74 as shown in FIG. 8. Furthermore, this same track also includes a through hole 94 disposed thereon near its outboard end as shown in FIG. 8. This track is designated as the drive track 96 of the present invention.

The present invention also includes a first pair and second pair of roller mechanisms 100 as best illustrated in FIG. 7.

Figure 3:
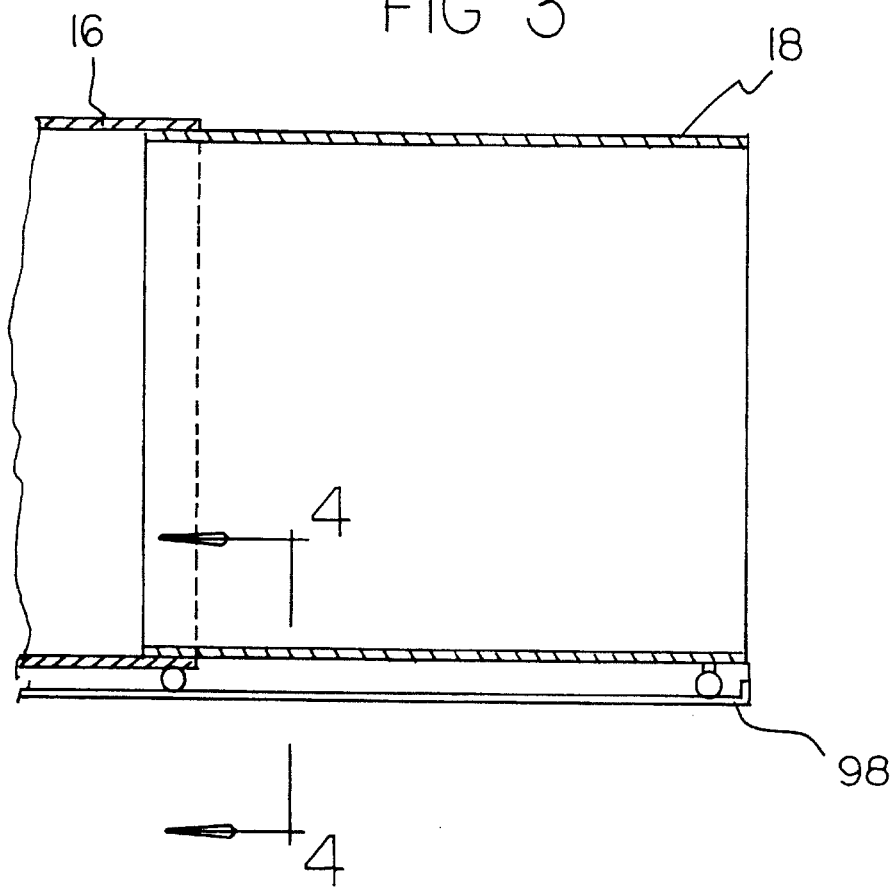
FIG. 3 is a cross-sectional view of the mating of the intermediate and rear sections of the present invention.

Each roller mechanism of the first pair of coupled to a separate bottom flange 26 of the intermediate section 16. One roller mechanism of the first pair is extended downwards into the drive track 96 as shown in FIG. 7 and the other roller mechanism of the first pair is extended downwards into the other track 98 as shown in FIG. 3. Each roller mechanism of the second pair is coupled to a separate bottom flange 26 of the rear section 18. One roller mechanism of the second pair is extended downwards into the drive track 96 as shown in FIG. 7 and the other roller mechanism of the second pair is extended downwards into the other track 98 as shown in FIG. 3. As best illustrated in FIG. 4, each roller mechanism includes a generally vertical cylindrical shaft having an upper portion positioned within the groove 90 of one of the tracks and a lower portion positioned within the interior portion 88 of one of the tracks. Furthermore, a horizontal cylindrical rotatable axle 104 is coupled to the lower portion of the shaft 102. A pair of wheels 106 are coupled to the ends of the axle and disposed upon the interior surface 78 of the bottom wall 76 for movement along the corresponding track. Each roller mechanism is formed of a rigid material such as metal or plastic.

A drive mechanism is included with the present invention. One component of the drive mechanism is a motor 110. The motor has a fixed stator 112 coupled to the drive track and a rotatable rotor 114. The rotor of the motor is extended within the through hole 94 of the drive track and into the interior portion 88. The stator imparts rotation to the rotor when electrically energized with a positive polarity and further imparts opposite rotation to the rotor when electrically energized with a negative polarity. Electrical energy is provided to the motor through wires 116 coupled thereto. The distal ends of the wires are coupleable to an external electrical energy source such as a battery of a vehicle. The motor is conventional in design and commercially available. A power switch is also included and coupled between the motor and battery for controlling motor operations.

Another component of the drive mechanism is a drive gear 120. The drive gear is formed of a rigid material such as metal or plastic. The drive gear is coupled to the rotor 114 of the motor at a location near the interior portion 88 of the drive track 96.

To transfer torquing motion from the motor, a belt 130 is included as part of the drive mechanism. The belt can be formed of a plastic or metal material. The belt is extended about the drive gear 120 and pulley 96 of the drive track and further engaged with the axles 104 of the roller mechanisms within the drive track. Now, when the motor 110 is energized with a positive polarity, the belt 130 turns for rotating the wheels of the roller mechanisms for allowing the intermediate sections 16 and rear section 18 to move along the tracks and away from the front section. Thus, the canopy can be extended. When the motor is energized with a negative polarity, the belt turns for rotating the wheels of the roller mechanisms for allowing the intermediate sections and rear section to move along the tracks towards the front section. Thus, the canopy can be retracted. Sufficient slippage is provided between the belt and drive gear for precluding the motor from burning out when the sections are fully extended or fully retracted. Alternately, position sensors can be employed along the track and placed in operative association with the motor for determining the extent of retention or retraction of the sections and thereby disengage the motor at an appropriate time.

The present invention is a retractable top for a pick-up truck that is fashioned in overlapping sections so that the bed of a pick-up truck can be exposed in stages to accommodate almost any size load without having to remove it. The present invention is fabricated from aluminum or fiber glass in multiple sections. The sections are installed onto a pick-up truck using a pair of special tracks. The tracks allow the sections to slide forwards and backwards with respect to a cab of a pick-up truck. An electric motor, which is operated from inside the cab of a pick-up truck, drives a chain or belt for moving the individual sections upon roller mechanisms. Each successive section is made smaller than the previous one so that they can be moved along the tracks with respect to one another. The design of the present invention enables the sections to move to expose as much of the bed of a pick-up truck as is necessary for a particular load. The rear section has a hinged back window with a convenient latch on it for opening and closing. Windows can also be placed on one or all of the individual sections.

In use, the present invention is normally extended over the entire bed of a pick-up truck. In this fashion, the present invention performs much like an ordinary pick-up truck bed cover. When a load is too bulky to fit into the bed under the top, the sections are simply retracted to accommodate the size of the load. Prior art tops for pick-up trucks must be removed in such cases. The present invention provides a covered cargo area that is far more flexible in its employment than other pick-up truck top designs. When large loads are to be carried, the size of the present invention can be altered to accommodate them without it having to be removed from a pick-up truck.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A retractable top for a bed of a pick-up truck for shielding items placed within a bed of a pick-up truck comprising, in combination:

an elongated canopy securable over a bed of a pick-up truck, the canopy formed of a substantially rigid front section, a substantially rigid rear section, and a substantially rigid intermediate section, each section having a generally c-shaped vertical cross-section formed of a generally horizontal planar rectangular top panel and two opposed spaced outer panels and with each outer panel extended downwards from the top panel to define a generally rectangular planar side wall and then extended inwards at a location remote from the top panel to define a bottom flange, each section further having an exterior surface, an interior surface, and a periphery interconnecting the surfaces formed of an inboard edge, an outboard edge, and a pair of opposed side edges extended between the inboard edge and the outboard edge, each inboard edge of the intermediate section and the rear section including a lip formed thereon and with each lip projected downwards and outwards at a juncture of one of the side walls with its corresponding bottom flange, each outboard edge of the front section and the intermediate section including a stop formed thereon and with each stop projected upwards and inwards at a juncture of one of the side walls with its corresponding bottom flange, the intermediate section telescopically received and slidably disposed in facing contact with the front section and with the lips of the intermediate section abuttable against the stops of the front section to preclude their separation, the rear section telescopically received and slidably disposed in facing contact with the intermediate section and with the lips of the rear section abuttable against the stops of the intermediate section to preclude their separation, each side wall of the front section further including an oblong recess disposed thereon covered with a generally transparent sheet to define a front window, each side wall of the intermediate section further including a generally u-shaped cut out formed thereon at a location adjacent to the outboard edge thereof covered with a generally transparent sheet to define an intermediate window, each side wall of the rear section further including a generally u-shaped cut out formed thereon at a location adjacent to the inboard edge thereof covered with a generally transparent sheet to define a rear window and with the rear window aligned with the intermediate window to define a telescopically extendable composite window, the rear section additionally including a generally transparent rear wall having a top edge, a bottom edge, and a pair of opposed side edges extended between the top edge and bottom edge and with the top edge of the rear wall hingeably secured to the outboard edge adjacent to the top panel to define a back window, the rear wall additionally having a latch mechanism coupled thereto for securing the rear wall to a tailgate of a pick-up truck;

a pair of elongated rigid tracks, each track having an inboard end and an outboard end, each track further having a generally c-shaped cross-section formed of a bottom wall with an interior surface and an exterior surface and with the exterior surface securable to a side wall of a pick-up truck adjacent to its bed, a pair of side walls extended upwards from the bottom wall, and a pair of opposed top edges extended inwardly from the side edges at a location remote from the bottom wall to define a hollow interior portion and a groove for allowing access to the interior portion, one of the tracks including a pulley disposed within its interior portion and secured to its outboard end and a through hole disposed thereon near its inboard end to thereby define a drive track;

a first pair and a second pair of roller mechanisms, each roller mechanism of the first pair coupled to a separate bottom flange of the intermediate section and with one roller mechanism of the first pair extended downwards into the drive track and the other roller mechanism of the first pair extended downwards into the other track, each roller mechanism of the second pair coupled to a separate bottom flange of the rear section and with one roller mechanism of the second pair extended downwards into the drive track and the other roller mechanism of the second pair extended downwards into the other track, each roller mechanism including a generally vertical shaft having an upper portion positioned within the groove of one of the tracks and a lower portion positioned within the interior portion of one of the tracks, a horizontal rotatable axle coupled to the lower portion of the shaft, and a pair of wheels coupled to the ends of the axle and disposed upon the interior surface of the bottom wall of one of the tracks;

a motor having a fixed stator coupled to the drive track and a rotatable rotor extended within its through hole and into its interior portion, the stator imparting rotation to the rotor when electrically energized with a positive polarity and further imparting opposite rotation to the rotor when electrically energized with a negative polarity;

a drive gear coupled to the rotor of the motor at a location within the interior portion of the drive track; and a belt extended about the drive gear and pulley of the drive track and engaged with the axles of the roller mechanisms within the drive track;

whereby when the motor is energized with a positive polarity, the belt turns for rotating the wheels of the roller mechanisms for allowing the intermediate section and rear section to move along the tracks away from the front section, thereby extending the canopy, and when the motor is energized with a negative polarity, the belt turns for rotating the wheels of the roller mechanisms for allowing the intermediate section and rear section to move along the tracks towards the front section, thereby retracting the canopy.

2. A retractable top for a bed of a pick-up truck comprising:

an elongated canopy securable over a bed of a pick-up truck, the canopy formed of a plurality of telescopically mated substantially rigid sections with each section having a generally c-shaped vertical cross-section formed of a generally horizontal top panel and two opposed spaced outer panels and with each outer panel extended downwards from the top panel to define a generally rectangular planar side wall and then extended inwards at a location remote from the top panel to define a bottom flange, each section further having an exterior surface, an interior surface, and a periphery interconnecting the surfaces formed of an inboard edge, an outboard edge, and a pair of opposed side edges extended therebetween, each bottom flange including a plurality of rotatable roller mechanisms coupled thereto and extended downwards therefrom;

a track mechanism coupleable to side walls of a bed of a pick-up truck and slidably engaged with the roller mechanisms of the canopy for allowing extension and retraction of the canopy;

an electrically-energizable drive mechanism coupled to the track mechanism and engaged with the roller mechanisms for extending and retracting the canopy;

wherein each inboard edge of each section includes a lip formed thereon and with each lip projected downwards and outwards at a juncture of one of the side walls with its corresponding bottom flange; and wherein each outboard edge of each section includes a stop formed thereon and with each stop projected upwards and inwards at a juncture of one of the side walls with its corresponding bottom flange and with a pair of stops abuttable against a corresponding pair of lips to preclude separation of the corresponding adjoined sections.

* * * * *